March 22, 1955 G. F. WALTERS 2,704,523
APPARATUS FOR INJECTING FIRE SCALE ELIMINATING CHEMICALS
AND SECONDARY AIR INTO FURNACES WITH STEAM
Filed June 22, 1950 2 Sheets-Sheet 1

INVENTOR.
George F. Walters
BY
Otto A. Earl
Attorney.

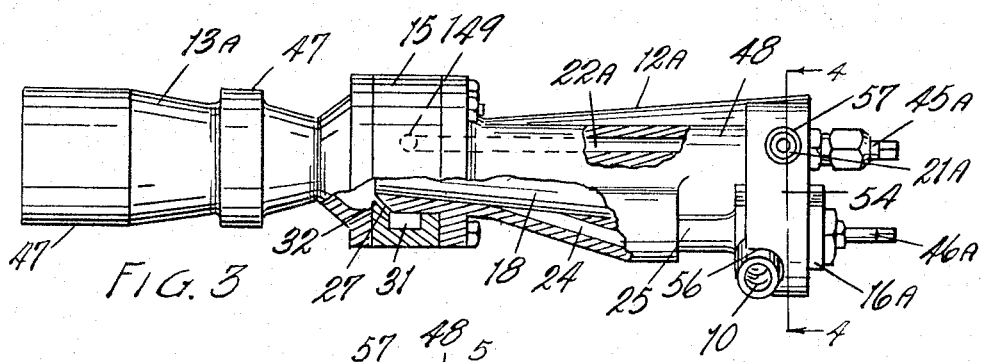
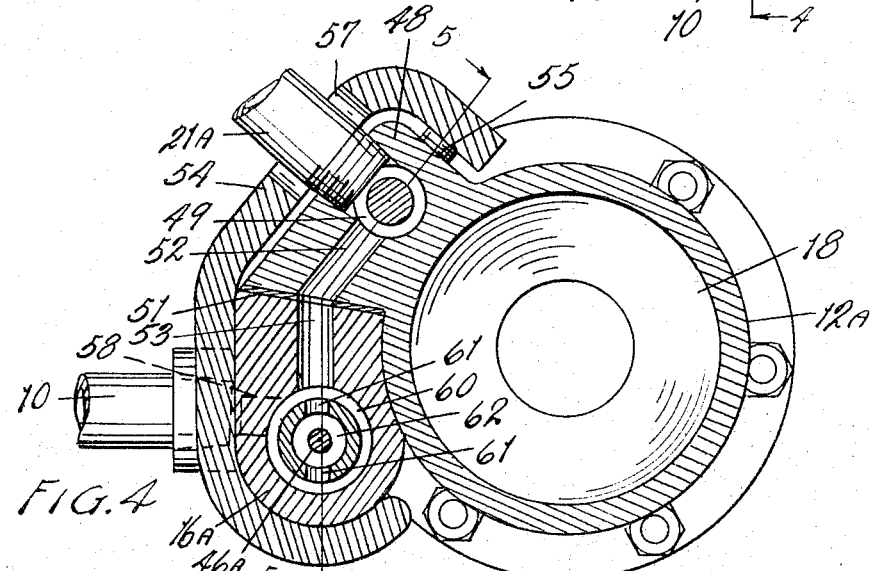
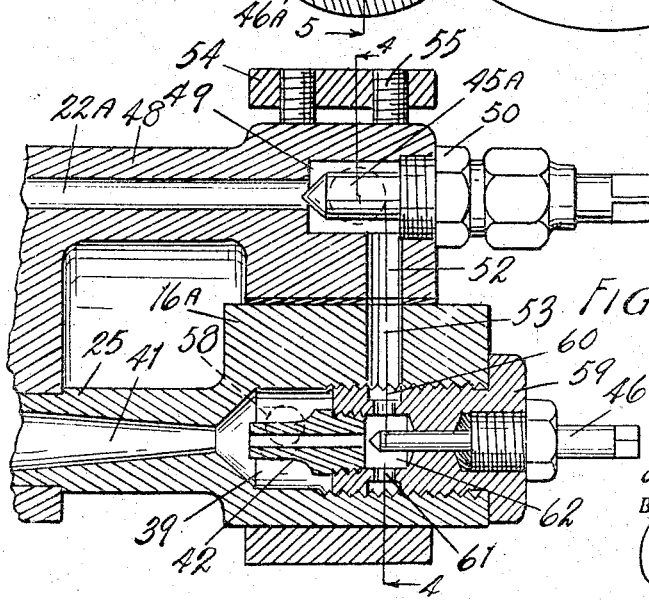

United States Patent Office 2,704,523
Patented Mar. 22, 1955

2,704,523

APPARATUS FOR INJECTING FIRE SCALE ELIMINATING CHEMICALS AND SECONDARY AIR INTO FURNACES WITH STEAM

George F. Walters, Gary, Ind.

Application June 22, 1950, Serial No. 169,726

15 Claims. (Cl. 110—1)

This invention relates to improvements in apparatus for ejecting fire scale eliminating chemicals and secondary air into furnaces with steam.

The principal objects of this invention are:

First, to provide novel means for obtaining complete combustion in furnaces by the introduction of secondary air into the combustion zone of the furnace.

Second, to provide novel means and apparatus for preventing the formation of fire scale on the water tubes of a boiler by the introduction of chemical agents into the combustion zone.

Third, to provide means and apparatus for rendering accumulated fire scale easily removable from the water tubes of a boiler by changing the chemical character of the fire scale by the introduction of chemicals into the combustion zone.

Fourth, to provide apparatus for injecting secondary air and chemical agents into the combustion zone of a furnace in accurately controllable and relatively variable quantities.

Fifth, to provide injection apparatus for injecting secondary air and a powdered chemical into a furnace, the amount of chemical admitted by the apparatus being entirely independently adjustable.

Sixth, to provide a method and apparatus for operating furnaces and steam boilers at increased efficiency and with reduced maintenance costs.

Other objects and advantages relating to details of my invention will be apparent from a consideration of the following description and claims. The accompanying drawings, of which there are two sheets, illustrate a preferred system for practicing my method and two satisfactory forms of apparatus for use in the method.

Fig. 3 is an elevational view, partially broken away in section of a refined form of injector used in my method.

Fig. 4 is a transverse cross sectional view through the injector shown in Fig. 3, taken along the line 4—4.

Fig. 5 is a cross sectional view taken along the planes of the line 5—5 in Fig. 4.

Figure 1:
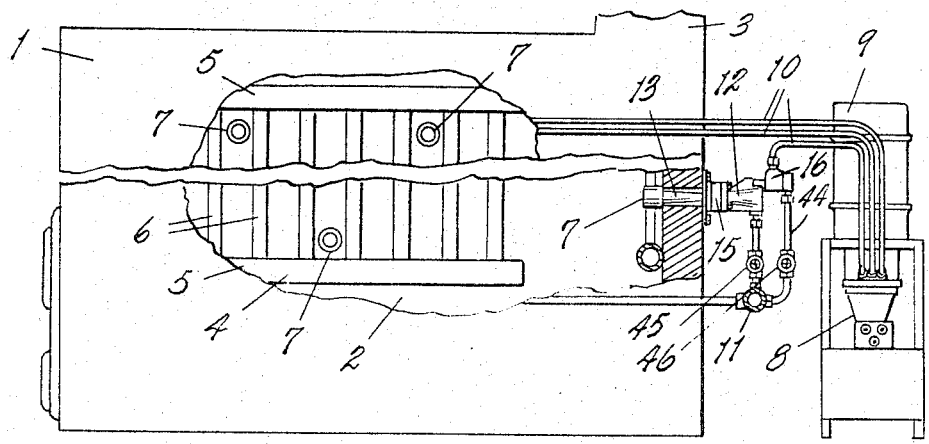
Fig. 1 is an elevational view partially broken away in vertical cross section illustrating my apparatus as applied to a boiler furnace, the boiler and furnace being illustrated more or less conventionally.

As is well known, the operation of large capacity furnaces and boilers is a relatively delicate and complex operation as regards the proportioning of air and fuel admitted to the furnace to obtain the most complete combustion possible. Further, the operation of large furnaces has heretofore required extensive maintenance operations for the removal of accumulated soot and fire scale from furnace walls and from the water tubes and other heat transfer portions of the boiler.

I now propose to improve the combustion in a furnace by addition of secondary combustion air to the combustion area in a novel and highly effective manner. This improved combustion functions to reduce the amount of soot accumulated in the furnace and on the boiler and to a certain extent to reduce the amount of fire scale collecting on the heat exchange surfaces of the boiler. I further propose to introduce scale reducing chemicals into the combustion area, continuously or intermittently, along with the secondary air to further reduce the accumulation of fire scale on the furnace and boiler surfaces and to render fire scale already accumulated easily removable with air lances.

In the drawings I have conventionally illustrated a boiler furnace 1 having a combustion area 2 and smoke flue 3. The boiler elements within the furnace include the water walls 4 and such other water tubes and heat exchange tubes (not illustrated) as may be desired. The water walls illustrated conventionally include headers 5 and vertically arranged water tubes 6.

Projecting through the walls of the furnace at various positions are a plurality of injector units generally indicated at 7, and it will be noted that the units project between the vertical tubes 6 of the water walls along both the side and back walls of the furnace at different levels within the combustion area 2. Various sizes and types of boiler furnaces will, of course, require various arrangements of the injectors, depending upon the capacity of the furnace and the normal path of the products of combustion therein.

Generally indicated at 8 is a distributing apparatus for distributing a chemical agent in powdered form to the several injectors 7. The chemical agent consists of a mixture of sodium chloride and sodium chlorate crystals. The chemicals are supplied from a container 9 positioned over the distributing apparatus. The distributing apparatus, which is more particularly described and claimed in my co-pending application, Serial No. 109,194, filed August 8, 1949, now Patent No. 2,553,024, for System and Apparatus for Distributing and Delivering Granular Materials, operates to provide a continuous supply of the chemical crystals in a cloud or air suspended state where they may be drawn off into the chemical supply pipes 10 in variable and controllable quantities, depending upon the degree of vacuum maintained in the pipes 10. It will be understood that a separate pipe 10 is preferably provided for each injector, although in some instances it may be possible to supply two or more injectors from a single pipe.

The energy for operating the injectors 7 consists of a fluid under pressure supplied through the main 11. This fluid may be compressed air but more conveniently consists of steam from the boiler itself.

Figure 2:
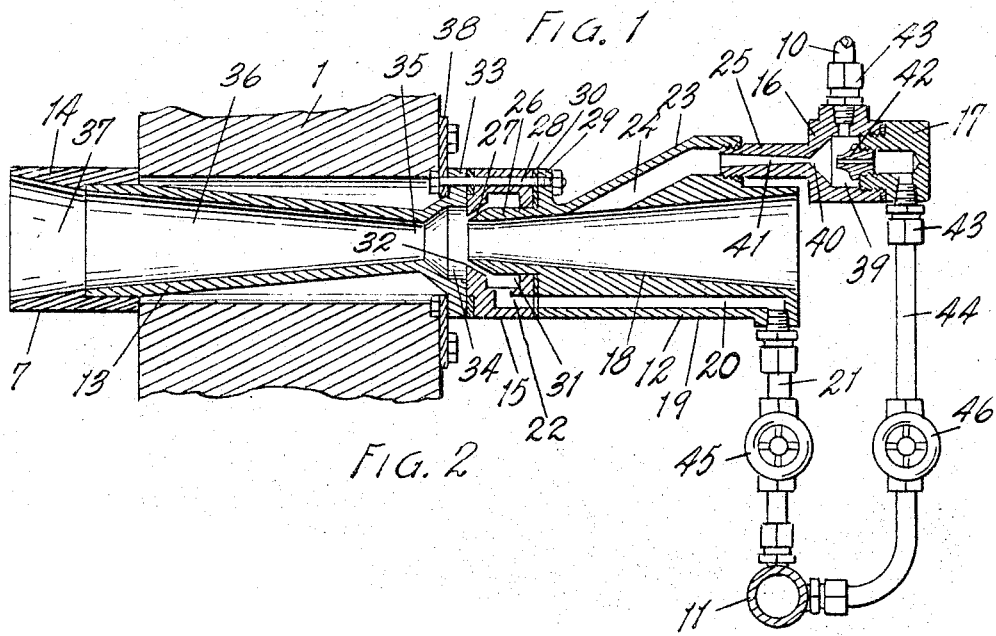
Fig. 2 is an enlarged vertical cross sectional view through the injection mechanism of my apparatus as mounted on a furnace wall.

The first form of injector apparatus which is more clearly shown in Fig. 2 consists of an inlet member 12 positioned on the exterior of the furnace and a delivery member 13 projecting through the wall of the furnace. A tip extension 14 on the inner end of the delivery member is desirably made of high temperature resistant metal to withstand the temperatures encountered within the furnace. The inlet member 12 and delivery member 13 are spaced by and secured to opposite sides of a collar member 15. A chemical injector body 16 is secured to the inlet member 12 for the controlled delivery of the chemical agents from the pipe 10 to the inlet member. A steam chamber block 17 secured to the chemical injector body 16 admits steam thereto.

More particularly, the inlet member 12 consists of a suitably formed casting having a central inwardly converging inlet passage 18 formed therethrough. A boss 19 on the lower side of the inlet body has a longitudinal steam passage 20 formed therein adapted to be connected at its outer end to the pipe 21 and communicating at its inner end with a port 22 formed in the collar member 15. A second boss 23 formed on the top side of the inlet member has a chemical delivery passage 24 formed therein and opening obliquely to the secondary air passage 18 toward the inner end of the air passage. The outer end of the chemical passage 24 is threaded to receive the nipple 25 on the chemical injector 16. The inner end of the supply member 12 consists of a nipple or tip 26 of reduced circular cross section and having an inwardly converging tapered portion 27 at its inner end. The nipple 26 is received within the collar 15 as illustrated, and the inlet member 12 is secured to the collar member 15 by bolts 28 passed through a flange 29 around the inlet member. Shims or washers 30 positioned between the flange and the collar member adjust the projection of the nipple into the collar.

The collar member 15 consists of a generally cylindrical body having a central cylindrical recess 31 of greater diameter than the nipple 26. A circular hole in the outer wall of the collar member receives and closely embraces the nipple while an inwardly converging hole 32 in the inner wall of the collar member 15 receives the tapered inner end of the nipple 26. By adjusting the thickness of the shims 30 the opposed faces of the inner ends of the nipple and the collar 15 are made to form a conical throat of thin circular cross section. The thickness of the throat section is obviously variable with the thickness of the shims 30.

The delivery member 13 is conveniently formed as a casting and has an outer flange 33 secured to the collar 15 by the bolts 28. The outer end of the delivery member forms a mixing chamber 34 embracing the inner ends of the conical throat and the converging air passage 18. The mixing chamber 34 itself converges to a reduced throat 35 which is preferably located slightly inwardly of the apex of the conical throat. Inwardly of the throat 35 the delivery member forms a diverging delivery passage 36 which increases substantially constantly to the interior of the furnace. The high temperature tip 14 desirably forms an expanding continuation of the delivery passage as at 37.

The injecting unit as a whole is mounted on the wall of a furnace by means of an annular plate 38, which is secured to the delivery member by the bolts 28.

The chemical injector body 16 has formed therein a vacuum chamber 39 which communicates through the reduced throat 40 with a passage 41 formed in the nipple 25. The passage 41 opens into the chemical delivery passage 24 previously described. One side of the vacuum chamber 39 opens from the body 16 and is threaded to receive the steam chamber block 17. The steam block 17 is chambered and carries a nozzle 42 which projects into the vacuum chamber 39 and discharges toward the throat 40. A coupling 43 provides for attachment of the steam pipe 44 to the steam block. The chemical injector member and steam block form a familiar type of steam injector.

A coupling 43 on the chemical injector member 16 provides for attachment of one of the chemical supply pipes 10 to the member 8 and the introduction of the crystals of chemical material into the vacuum chamber 39.

The admission of steam under pressure to the passage 20 and chamber 31 in the collar 15 is controllable by a valve 45 in the steam pipe 21, and the admission of steam to the steam block 17 is controlled by a valve 46 in the steam pipe 44.

The method of increasing combustion and eliminating fire scale in the furnace and the operation of the foregoing apparatus which constitute my invention is as follows. A number of the injectors 7 are mounted in the furnace walls as described, the exact number being determined by the size and capacity of the furnace and the amount of secondary air which must be admitted thereto to provide complete combustion. No fixed rule for the required number of injectors is possible since the draft conditions and rate of firing of furnaces may vary, resulting in variation in the rate of passage of the products of combustion through the furnace. It is believed sufficient to point out at this time that the amount of fuel and primary air entering the furnace in a given period of time may be calculated. The exhaust gases may be measured and analyzed. From this the number of injectors required to provide the necessary amount of secondary air to obtain complete combustion in the furnace may be calculated. The injectors are positioned in staggered relation and at at least two elevations around the furnace walls.

Steam under pressure entering through the conical throat between the inlet member 12 and the collar member 28 creates a vacuum in the vacuum chamber 34 and in a well-known manner causes a regulatable supply of secondary air to be drawn through the inlet passage and directed through the delivery passages 36 and 37 at high velocity. The expanding character of the passages 36 and 37 causes this secondary air to mushroom or expand directly into the combustion area 2 of the furnace. The sum effect of the several injectors on the furnace is to create a turbulence in the products of combustion and break up any tendency of the hot gases to follow a short direct path from the combustion area 2 to the smoke flue 3.

The products of combustion are thus held in the furnace for a greater period of time which permits all of the combustibles to be fully burned or reduced before passing out through the smoke flue. The turbulence within the combustion chamber further tends to retain any small particles of ash and fuel within the combustion area until they are fully burned. A large proportion of the fly ash, as it is commonly called, then falls to the grate rather than being carried through the boiler tubes to the smoke flue. Since less ash comes in contact with the boiler tubes and water walls, there is less tendency for the ash to accumulate on the boiler surfaces.

The foregoing function of my apparatus effectively eliminates smoke of the furnace and to a certain extent reduces the accumulation of scale on the boiler parts. However, a certain proportion of the fly ash will be maintained in a semi-liquid or adhesively plastic state in the atmosphere of the combustion chamber, and when these particles strike the heat exchange surfaces of the furnace or boiler, which are relatively cool, the particles of plastic ash will cool and adhere to the surfaces tending to build up a coating or scale. It is to reduce and remove this fire scale from the combustion atmosphere and the surface of the furnace that the apparatus and step of adding chemical agents through the injector is provided. As previously indicated, a highly satisfactory form of chemical agent for this purpose is a mixture of crystallized sodium chloride and sodium chlorate. The vacuum created in the vacuum chamber 39 by admission of steam through the nozzle 42 draws in a supply of these crystals from the pipe 10, which is proportional to the vacuum created. The crystals are delivered through the passages 41 and 24 to the inlet passage 18, where they are carried into the combustion chamber 2 along with the secondary air. At this time it should be noted that, due to the inwardly directed opening of the passage 24 into the secondary air passage 18 at an acute angle, the degree of vacuum in the mixing chamber 34 has little or no effect on the amount of crystals drawn into the injector. The amount of chemicals injected is therefore almost exclusively under the control of the valve 46.

The sodium chloride and sodium chlorate crystals which are distributed into the swirling atmosphere in the combustion chamber chemically combine with the fly ash in the combustion area and create a sulphate compound in place of the free fly ash. The conversion of the fly ash to a sulphate has two immediate effects in the furnace. In the first place, the melting point of the sulphate compound is higher than the melting point of the fly ash so that the sticky and plastic fly ash is converted to a relatively non-sticky substance which does not adhere to the furnace and boiler surfaces when it comes in contact with them. Second, the scale which may already have accumulated on the surfaces is also reduced to a sulphate of non-sticky character so that there is no cohesion or tendency for the free particles of ash to accumulate and build up on the surfaces. Further, the sulphated coating on the surfaces which is not carried away by the natural draft of the furnace is easily removed by directing a blast of air along the surfaces by means of an air lance.

The second form of air and chemical injector illustrated in Figs. 3 to 5 operates on exactly the same principle as the first form of injector, described above, but incorporates certain structural changes which make the injector more compact. The second form of the injector includes an inlet member 12A and a delivery member 13A secured on opposite sides of a collar member 15 which is the same as in the first form of injector. The delivery member 13A is the same as the delivery member 13 except that it is provided on its outside with cylindrically turned or shaped surfaces 47 adapted to fit snugly and slidably within a pipe or tube extending through the wall of the furnace.

The inlet member 12A has a radially thickened rib 48 cast integrally thereon within which the steam injector passage 22A is formed. The inner end of the passage 22A communicates through the port 149 with the throat in the interior of the collar member as in the first form of the injector. The outer end of the boss 48 and the passage 22A are counterbored to form a steam header or chamber 49 to which a single steam supply pipe 21A is connected. A packing 50, which closes the outer end of the steam header, carries the regulating valve 45A cooprative with the outer end of the passage 22A to regulate the amount of steam admitted to the port 149 and therefore the amount of secondary air drawn through the inlet passage 18.

One side surface of the rib 48 is machined flat radially of the inlet passage 18 as at 51 and a steam port 52 is formed in the rib from the face to the header 49. The chemical injector body 16A has one flat side abutted against the surface 51 on the rib and is provided with a steam port 53 registering with the port 52. A generally C-shaped clamp 54 embraces the chemical injector body and draws it tight against the flat face 51 by means of the screws 55 which bear against the opposite side of the rib 48. A steam tight joint between the rib and the chemical injector body is thus formed. The clamp 54 is cut away or notched as at 56 to pass the chemical supply pipe 10 where it attaches to the chemical injector body. The clamp 54 is further apertured as at 57 to pass the steam supply pipe 21A.

The chemical injector body 16A is provided with a nipple 25 which forms the chemical passage 41 opening to the oblique passage 24 as in the first form of the injector. The injector body also forms a suction chamber 39 into which the chemical supply pipe opens through the passage 58. The outer end of the suction chamber 39 is internally threaded to receive the screw plug 59 which projects inwardly beyond the end of the steam port 53. The inner end of the plug 59 has an annular groove 60 cut therein connecting the port 53 with the radial ports 61. The ports 61 open into a valve chamber 62 formed in the end of the plug while the tip 42 and the outer end of the jet passage therein forms a valve seat cooperative with the valve 46A carried by the plug.

The valve 46A serves to regulate the amount of steam passing through the nozzle 42 and therefore the degree of vacuum in the vacuum chamber 39. As in the first form of the injector this regulates the amount of chemical crystals delivered to the stream of secondary air through the passage 24.

The modified form of injector shown in Figs. 3 to 5 simplifies the mounting and operation of the injector in that only one steam supply pipe is required in place of the two used in the first form of the injector. Both valves for controlling the air injecting steam and chemical injecting steam are conveniently located on the body of the injector and may be adjusted simultaneously while viewing the condition of the fire in the furnace through the inlet passage 18.

In practicing my method of combustion and scale control in a furnace, the introduction of secondary air is preferably continuous during the operating period of the furnace. The addition of the chemical agents into the combustion area may be either continuous or intermittent, depending upon operating conditions and the type of fuel being used. Normally when continuous admission of chemicals is employed, the rate of such admission is less than that employed when intermittent injection is practiced.

Having thus described my invention, what I claim is new and desire to secure by Letters Patent is:

1. Apparatus for controlling combustion and scale formation in a boiler furnace comprising an inlet member having an inwardly contracting air inlet passage formed therethrough, a collar member secured around the inner end of said inlet member and having an interior annular groove formed therein coacting with said inlet member to form an annular steam chamber therearound, the adjacent inner ends of said inlet member and collar member forming a jet passage therebetween of thin conical section converging inwardly across the inner end of said air inlet passage, said collar and said inlet member having connecting steam passages formed therein opening to said steam chamber, a delivery member having a mixing chamber formed in its outer end registering with said jet passage and said inlet passage, said delivery member having an inwardly deverging delivery passage formed therein and opening to said mixing chamber through a restricted throat, said inlet member having a chemical supply passage formed therein and opening obliquely to said inlet passage toward the inner end thereof, a chemical supply member having a vacuum chamber formed therein, a nipple on said chemical supply member secured to said inlet member and having a passage formed therein communicating between said vacuum chamber and said chemical supply passage, a steam nozzle positioned to discharge into said vacuum chamber and toward the passage in said nipple, a chemical supply pipe opening to said vacuum chamber, means for maintaining a supply of chemical crystals in air suspension at the opposite end of said chemical supply pipe, separately controllable means for supplying steam under pressure to said nozzle and said steam passage in said inlet member, and means for mounting said members on the wall of a furnace with said delivery member opening to the interior of the furnace.

2. Apparatus for controlling combustion and scale formation in a boiler furnace comprising an inlet member having an inwardly contracting air inlet passage formed therethrough, a collar member secured around the inner end of said inlet member and having an interior annular groove formed therein coacting with said inlet member to form an annular pressure chamber, the adjacent inner ends of said inlet member and collar member forming a jet passage therebetween of thin annular section converging inwardly across the inner end of said inlet passage, said collar and said inlet member having connected fluid passages formed therein and opening to said pressure chamber, a delivery member having a mixing chamber formed in its outer end registering with said jet passage and said inlet passage, said delivery member having an inwardly diverging delivery passage formed therein and opening to said mixing chamber through a restricted throat, said inlet member having a chemical supply passage formed therein and opening obliquely to said air inlet passage toward the inner end thereof, a chemical supply member having a vacuum chamber formed therein, a nipple on said chemical supply member secured to said inlet member and having a passage formed therein communicating between said vacuum chamber and said chemical supply passage, a fluid nozzle positioned to discharge into said vacuum chamber and toward the passage in said nipple, a chemical supply pipe opening to said vacuum chamber, means for maintaining a supply of chemical crystals in air suspension at the opposite end of said chemical supply pipe, separately controllable means for supplying fluid under pressure to said nozzle and said fluid passage in said inlet member, and means for mounting said members on the wall of a furnace with said delivery member open to the interior of the furnace.

3. Apparatus for controlling combustion and scale formation in a boiler furnace comprising an inlet member having an inwardly contracting air inlet passage formed therethrough, a collar member secured around the inner end of said inlet member and having an interior annular groove formed therein coacting with said inlet member to form an annular pressure chamber, the adjacent inner ends of said inlet member and collar member forming a jet passage therebetween of thin annular section directed inwardly across the inner end of said inlet passage, said collar having a fluid pressure passage formed therein opening to said pressure chamber, a delivery member having a mixing chamber formed in its outer end registering with said jet passage and said inlet passage, said delivery member having an inwardly diverging delivery passage formed therein and opening to said mixing chamber, said inlet member having a chemical supply passage formed therein and opening obliquely to said air inlet passage, a chemical supply member having a vacuum chamber formed therein, said chemical supply member being connected to said inlet member and having a passage formed therein communicating between said vacuum chamber and said chemical supply passage, a fluid pressure nozzle positioned to discharge into said vacuum chamber and toward said chemical supply passage, a chemical supply pipe opening to said vacuum chamber, means for maintaining a supply of chemical crystals in air suspension at the opposite end of said chemical supply pipe, controllable means for supplying fluid under pressure to said nozzle and said fluid pressure passage, and means for mounting said members on the wall of a furnace with said delivery member open to the interior of the furnace.

4. Apparatus for controlling combustion and scale formation in a boiler furnace comprising an inlet member having an inwardly contracting inlet passage formed therethrough, a collar member secured around the inner end of said inlet member and having an interior annular groove formed therein coacting with said inlet member to form an annular pressure chamber, said inlet member and collar member forming a jet passage therebetween of thin annular section converging inwardly across the inner end of said inlet passage, said collar having a steam supply passage formed therein and opening to said pressure chamber, a delivery member having a mixing chamber formed in its outer end registering with said jet passage and said inlet passage, said delivery member having an inwardly diverging delivery passage formed therein and opening to said mixing chamber, means forming a chemical supply passage opening obliquely inwardly to said inlet passage toward the inner end thereof, a chemical supply member having a vacuum chamber formed therein, a nipple on said chemical supply member having a passage formed therein communicating between said vacuum chamber and said chemical supply passage, a steam nozzle positioned to discharge into said vacuum chamber and toward the passage in said nipple, a chemical supply pipe opening to said vacuum chamber, means for maintaining a supply of chemical crystals in air suspension at the opposite end of said chemical supply pipe for delivery therethrough under the influence of the vacuum in said vacuum chamber, and separately controllable means for supplying steam under pressure to said nozzle and said steam supply passage.

5. Apparatus for controlling combustion and scale formation in a boiler furnace comprising an inlet member having an inwardly contracting inlet passage formed therethrough, a collar member secured around the inner end of said inlet member and having an interior annular groove formed therein coacting with said inlet member to form an annular pressure chamber, said inlet member and collar member forming a jet passage therebetween of thin annular section around said inlet passage and opening inwardly therewith, said collar having a steam supply passage formed therein and opening to said pressure chamber, a delivery member having a mixing chamber formed in its outer end registering with said jet passage and said inlet passage, said delivery member having an inwardly diverging delivery passage formed therein and opening to said mixing chamber, means forming a chemical supply passage opening obliquely inwardly to said inlet passage, a chemical supply member having a vacuum chamber formed therein, a nipple on said chemical supply member having a passage formed therein communicating between said vacuum chamber and said chemical supply passage, a steam nozzle positioned to discharge into said vacuum chamber and toward the passage in said nipple, a chemical supply pipe opening to said vacuum chamber, means for maintaining a supply of chemical crystals at the opposite end of said chemical supply pipe for delivery therethrough under the influence of the vacuum in said vacuum chamber, and separately controllable means for supplying steam under pressure to said nozzle and said steam supply passage.

6. In combination with a boiler furnace having a combustion chamber, apparatus for improving combustion and controlling scale formation comprising, a plurality of injector assemblies having diverging delivery mouths communicating with and positioned to discharge into the combustion area of the combustion chamber of the furnace at different levels and at spaced staggered positions around the walls thereof, said assemblies defining passageways for secondary air communicating with said mouths, first injector means in said assemblies connected to said first passageways to induce a supply of secondary air through said first passageways, second injector means associated with said assemblies and defining other passageways communicating obliquely with said first passageways and adapted to deliver a supply of ash reducing chemicals obliquely to the streams of secondary air passing through said first passageways, chemical supply means for maintaining a supply of chemicals in air suspension and connected to said other passageways for delivery thereto, and separately controllable fluid pressure means connected to said injectors for actuating said first and second injector means.

7. In combination with a boiler furnace having a combustion chamber, apparatus for improving combustion and controlling scale formation comprising, a plurality of injector assemblies having diverging delivery mouths communicating with and positioned to discharge into the combustion area of the combustion chamber of the furnace at different levels and at spaced staggered positions around the walls thereof, said assemblies defining passageways for secondary air communicating with said mouths, first injector means in said assemblies connected to said first passageways to induce a supply of secondary air through said first passageways, second injector means associated with said assemblies and defining other passageways communicating with said first passageways and adapted to deliver a supply of ash reducing chemicals to the streams of secondary air passing through said first passageways, chemical supply means connected to said other passageways for delivery thereto, and separately controllable fluid pressure means connected to said injectors for actuating said first and second injector means.

8. In combination with a boiler furnace having a combustion chamber, apparatus for improving combustion and controlling scale formation comprising, a plurality of injector assemblies having diverging delivery mouths communicating with and positioned to discharge into the combustion area of the combustion chamber of the furnace at different levels, said assemblies defining passageways for secondary air communicating with said mouths, first injector means in said assemblies connected to said first passageways to deliver a supply of secondary air through said first passageways, second injector means associated with said assemblies and defining other passageways communicating with said first passageways and adapted to deliver a supply of ash reducing chemicals to the streams of secondary air passing through said first passageways, chemical supply means connected to said other passageways for delivery thereto, and separately controllable fluid pressure means connected to said injectors for actuating said first and second injector means.

9. In combination with a boiler furnace having a combustion chamber, apparatus for improving combustion and controlling scale formation comprising, a plurality of injector assemblies having diverging delivery mouths communicating with and positioned to discharge into the combustion area of the combustion chamber of the furnace at spaced positions around the walls thereof, said assemblies defining passageways for secondary air communicating with said mouths, first injector means in said assemblies connected to said first passageways to deliver a supply of secondary air through said first passageways, second injector means associated with said assemblies and defining other passageways communicating with said first passageways and adapted to deliver a supply of ash reducing chemicals to the streams of secondary air passing through said first passageways, chemical supply means connected to said other passageways for delivery thereto, and separately controllable fluid pressure means connected to said injectors for actuating said first and second injector means.

10. In combination with a boiler furnace having a combustion chamber, apparatus for improving combustion and controlling scale formation comprising, an injector assembly having a diverging delivery mouth communicating with and positioned to discharge into the combustion area of the combustion chamber of the furnace, said assembly defining a passageway for secondary air communicating with said mouth, first injector means in said assembly connected to said first passageways to deliver a supply of secondary air through said first passageways, second injector means associated with said assembly and defining another passageway communicating obliquely with said first passageway and adapted to deliver a supply of ash reducing chemicals obliquely to the stream of secondary air passing through said first passageway, chemical supply means for maintaining a supply of chemicals in air suspension and connected to said other passageway for delivery thereto, and separately controllable fluid pressure means connected to said injectors for actuating said first and second injector means.

11. In combination with a boiler furnace having a combustion chamber, apparatus for improving combustion and controlling scale formation comprising, an injector assembly having a delivery mouth communicating with and positioned to discharge into the combustion area of the combustion chamber of the furnace, said assembly defining a passageway for secondary air communicating with said mouth, first injector means in said assembly connected to said first passageways to deliver a supply of secondary air through said first passageways, second injector means associated with said assembly and defining another passageway communicating with said first passageway and adapted to deliver a supply of ash reducing chemicals to the stream of secondary air passing through said assembly, chemical supply means connected to said other passageway for delivery thereto, and controllable fluid pressure means connected to said injectors for actuating said first and second injector means.

12. Combustion and scale control apparatus for a boiler furnace comprising, a delivery member adapted to be mounted in the wall of the furnace and having an inwardly diverging delivery passage formed therein to open at its inner end into the interior of the furnace, means forming a steam injector at the outer end of said delivery passage, means forming a secondary air passage communicating with said injector and said delivery passage, means forming a chemical supply passage opening obliquely to said secondary air passage, means forming a second steam injector delivering to said chemical supply passage, a chemical supply pipe connected to said second steam injector and subject to the vacuum created thereby, means for maintaining a supply of chemical oxidizing crystals adjacent and in communication with an open end of said pipe, and separately controllable means connected to supply steam to said injectors.

13. Combustion and scale control apparatus for a furnace comprising, a delivery member adapted to be mounted in the wall of the furnace and having a delivery passage formed therein to open at its inner end into the interior of the furnace, means forming a steam injector at the outer end of said delivery passage, means forming a secondary air passage communicating with said injector and said delivery passage, means forming a chemical supply passage opening to said secondary air passage, means forming a second steam injector delivering to said chemical supply passage, a chemical supply pipe connected to said second steam injector and subject to the vacuum created thereby, means for maintaining a supply of chemical oxidizing crystals adjacent and in communication with an open end of said pipe, and separately controllable means connected to supply steam to said injectors.

14. Injector apparatus for delivering secondary air and finely divided combustion controlling material to the combustion space of a furnace comprising, a delivery member adapted to be mounted in the wall of the furnace to project inwardly through the wall and having an inwardly diverging delivery passage formed therein, said delivery member having a mixing chamber formed in its outer end and joining the small end of said delivery passage, a collar member secured to said delivery member and closing the outer end of said mixing chamber, said collar member having a central recess formed therein opening to said mixing chamber, an inlet member secured to the outer end of said collar member and having an inner end projecting into said recess and coacting with said collar member to form an annular jet passage opening inwardly to said mixing chamber, said inlet member having an inwardly converging secondary air inlet passage formed therein and extending therethrough and opening to said mixing chamber, said inlet member having a thickened wall portion forming a steam delivery passage opening to the recess in said collar member and having an enlarged steam header formed at the outer end of said steam delivery passage, a valve closing the outer end of said header and having a portion adjustably coacting with the end of said steam delivery passage to vary the delivery of steam thereto, a connection for a steam pipe opening to said steam header, said thickened portion having a by-pass passage formed therein opening between said steam header and a side surface of said thickened portion, a chemical injector body clamped against said side surface and having a port registering with said by-pass passage, a clamp for securing said chemical injector body against said side surface, a nozzle on said injector body connected to said inlet member and forming a chemical supply passage opening to said inlet member, said inlet member having a passage formed in the wall thereof communicating obliquely between said chemical supply passage and the secondary air inlet in said inlet member, said chemical injector body having a vacuum chamber formed therein and communicating with said chemical supply passage, a connection on said injector body for a chemical supply pipe and opening to said vacuum chamber, a closure for one end of said vacuum chamber and having a valve chamber formed therein communicating with said port in said injector body, a tip on the inner end of said closure forming a jet opening between said valve chamber and said vacuum chamber and directed into said chemical supply passage, and a valve carried by said closure coacting with the outer end of said jet opening.

15. Injector apparatus for delivering secondary air and finely divided combustion controlling material to the combustion space of a furnace comprising, a delivery member adapted to be mounted in the wall of the furnace to project inwardly through the wall and having a delivery passage formed therein, said delivery member having a mixing chamber formed in its outer end and joining the end of said delivery passage, a collar member secured to said delivery member and closing the outer end of said mixing chamber, said collar member having a central recess formed therein opening to said mixing chamber, an inlet member secured to the outer end of said collar member and having an inner end projecting into said recess and coacting with said collar member to form an annular jet passage opening inwardly to said mixing chamber, said inlet member having an inwardly converging secondary air inlet passage formed therein and extending therethrough and opening to said mixing chamber, said inlet member having a thickened wall portion forming a steam delivery passage opening to the recess in said collar member and having an enlarged steam header formed at the outer end of said steam delivery passage, a valve closing the outer end of said header and having a portion adjustably coacting with the end of said steam delivery passage to vary the delivery of steam thereto, a connection for a steam pipe opening to said steam header, said thickened portion having a by-pass passage formed therein opening between said steam header and a side surface of said thickened portion, a chemical injector body clamped against said side surface and having a port registering with said by-pass passage, means for securing said chemical injector body against said side surface, said injector body forming a chemical supply passage opening to said inlet member, said inlet member having a passage formed in the wall thereof communicating obliquely between said chemical supply passage and the secondary air inlet in said inlet member, said chemical injector body having a vacuum chamber formed therein and communicating with said chemical supply passage, a connection on said injector body for a chemical supply pipe and opening to said vacuum chamber, a closure for one end of said vacuum chamber and having a valve chamber formed therein communicating with said port in said injector body, a tip on the inner end of said closure forming a jet opening between said valve chamber and said vacuum chamber and directed into said chemical supply passage, and a valve carried by said closure coacting with the outer end of said jet opening.

References Cited in the file of this patent

UNITED STATES PATENTS

| | | |
|---|---|---|
| 251,740 | Simmons | Jan. 3, 1882 |
| 621,884 | Wilson | Mar. 28, 1899 |
| 668,787 | Vetillard | Feb. 26, 1901 |
| 814,550 | Lewis | Mar. 6, 1906 |
| 1,014,387 | Goff | Jan. 9, 1912 |
| 1,046,538 | Goff | Dec. 10, 1912 |
| 1,112,547 | Morin | Oct. 6, 1914 |
| 1,483,318 | Smith | Feb. 12, 1924 |
| 2,417,343 | Barrett | Mar. 11, 1947 |
| 2,451,422 | Wagner | Oct. 12, 1948 |
| 2,566,320 | De Roque | Sept. 4, 1951 |

FOREIGN PATENTS

| | | |
|---|---|---|
| 2,389 | Great Britain | of 1902 |
| 549,781 | Germany | May 2, 1932 |
| 395,282 | Great Britain | July 13, 1933 |
| 440,224 | Great Britain | Dec. 23, 1935 |